Nov. 5, 1957     H. S. HALPERN     2,812,489
STRAIN-GAGE BRIDGE NETWORK
Filed July 26, 1955
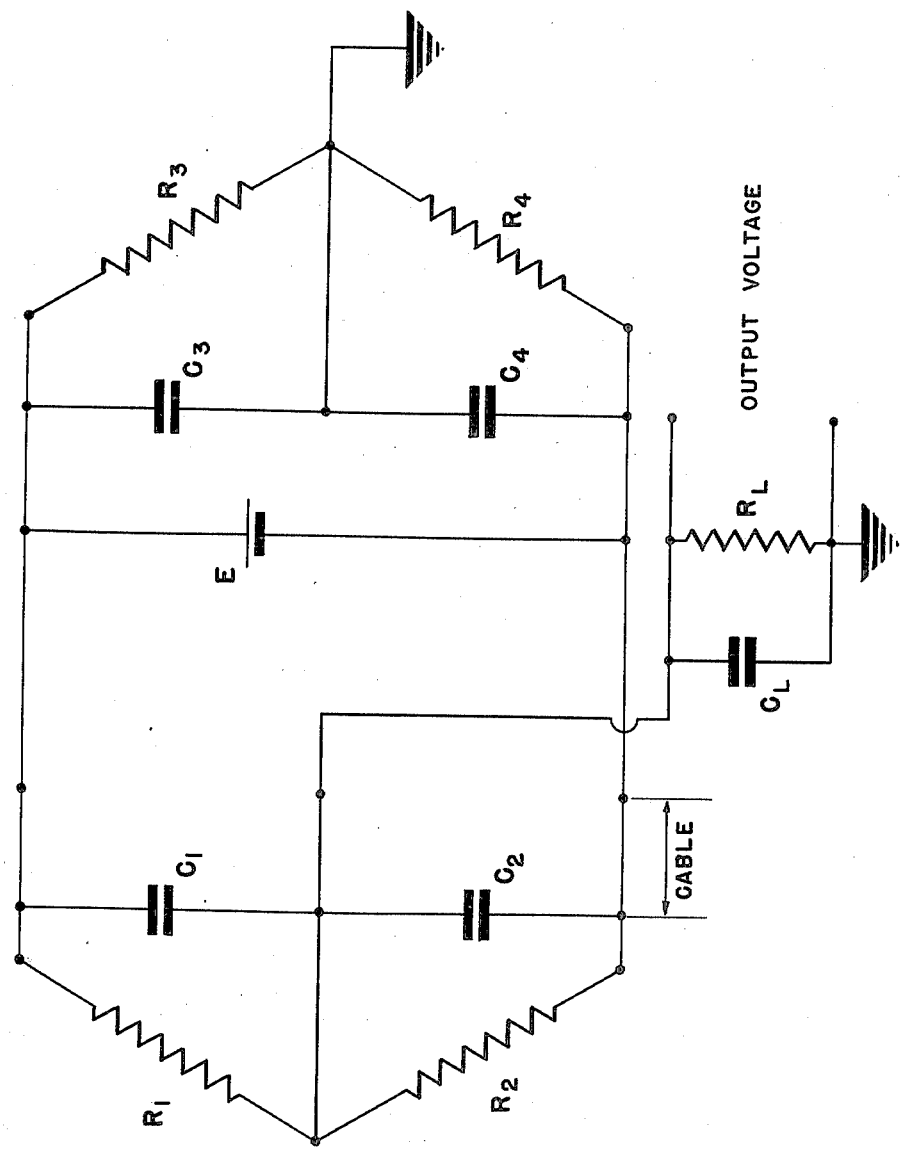
INVENTOR
HOWARD S. HALPERN
BY
ATTORNEYS

United States Patent Office 2,812,489
Patented Nov. 5, 1957

2,812,489
STRAIN-GAGE BRIDGE NETWORK

Howard S. Halpern, Stamford, Conn., assignor to the United States of America as represented by the Secretary of the Navy Application July 26, 1955, Serial No. 524,627

2 Claims. (Cl. 323—75)

(Granted under Title 35, U. S. Code (1952), sec. 266)

The invention described herein may be manufactured and used by or for the Government of the United States of America for governmental purposes without the payment of any royalties thereon or therefor.

This invention relates to strain-gage measurement of high frequency and transient phenomena. In addition, by the incorporation of a suitable transducer with pressure strain gages; the measurement of dynamic strains or pressures in gun mounts or industrial machinery may be accomplished by the inventive apparatus.

At the present time D. C. powered bridges are used occasionally, but no provision has been made for errors such as those occurring because of frequency response characteristics.

In the past bridges utilizing an alternating voltage source were frequently used. These bridges are limited to the measurement of a phenomena with fluctuations of long duration as compared with the carrier period. In addition, the A. C. bridge necessitates a balance for reactances as well as resistances.

Compensation for distributive capacitance in a particular resistance leg of an A. C. bridge has been provided as shown in Patent No. 2,494,499 to Wilhelm by connecting a variable neutralizing capacitor between an intermediate point in that particular leg and a remote bridge terminal. In the patent to Wilhelm there is shown an A. C. impedance measuring bridge and compensation which corrects only for the single frequency of the A. C. source, however the Wilhelm patent employs no cable and no suggested solution for restoring frequency response lost in the use of long cables is shown.

D. C. (direct current) bridge circuits avoid some of the problems of A. C. bridges but are defective in that a broad frequency response cannot be maintained when a long cable separates portions of the bridge.

The present invention overcomes these and other deficiencies of the prior art and in addition applies the idea of using compensating capacitors with a bridge circuit in a manner to improve frequency response.

Accordingly, an object of the invention is to increase the frequency response of a D. C. bridge to the vibrations indicated by the strain gages.

Another object of the invention is to take advantage of the simplicity feature of a D. C. bridge and the fact that the output can be fed directly to a recording instrument while eliminating prior art disadvantages of this type of circuit.

Other objects and many of the attendant advantages of this invention will be readily appreciated as the same becomes better understood by reference to the following detailed description when considered in connection with the accompanying drawing wherein:

The single figure shows a schematic diagram of a preferred embodiment of the apparatus of the invention.

In referring to the figure, the circuit of a D. C. powered bridge for measuring the voltage frequency variation of strain gages is shown in which strain-gage transducers are represented by $R_1$ and $R_2$, the lumped capacitors of a cable by $C_1$ and $C_2$, the known resistances of the bridge by $R_3$ and $R_4$, the added capacitors by $C_3$ and $C_4$ and the battery by E, and in which the output voltage is taken across a load circuit of resistance and capacitance as represented by $R_L$ and $C_L$.

The figure represents a circuit in which a pair of strain gages, $R_1$ and $R_2$, are separated by a long cable from the other two bridge arms; this was done by shunting in turn each cable lead to ground at each end of the cable with the same capacitor. The effect produced was independent of the end of the cable shunted showing that the cable could be treated as a group of lumped capacities, with cable resistances and inductances neglected.

The present invention shunts the resistors $R_3$ and $R_4$ with capacitors $C_3$ and $C_4$ the capacitance of $C_3$ and $C_4$ being very large as compared with the sum of the capacitances $C_L$, $C_1$, and $C_2$. This arrangement improves the frequency response of the system. The internal resistance of the battery is assumed to be negligible. The shunting of resistors $R_3$ and $R_4$ with large capacitors makes the frequency response valid for otherwise consequential battery resistance by holding voltages at the battery terminals constant during a cycle of strain-gage resistance change. Minor fluctuations due to the capacitance of the cable are leveled out by the addition of the large capacitors $C_3$ and $C_4$. It is to be noted that either capacitors $C_3$ or $C_4$ alone can be made very large and it is not necessary to increase both simultaneously.

When the bridge is balanced before taking any measurements, no current will flow in the output as long as the ratio $R_1$ to $R_2$ equals the ratio $R_3$ to $R_4$. The output voltage is the variation of the voltage from the balance point caused by the change of resistance of the strain gage. The output is taken at the terminals across $R_L$ and $C_L$.

Although the invention is in nowise to be limited hereby, the following values proved suitable as one application of the inventive circuit. $R_1$ and $R_2$ were 10K strain-gage transducers, $R_3$ and $R_4$ were 1K resistances, $C_3$ and $C_4$ were .5 microfarad capacitors and the battery had an E. M. F. (electromotive force) of 45 volts. The cable in this instance consisted of a 100 foot or 200 foot three conductor shielded cable in which the capacitance between any one conductor and the remaining conductors connected to a shield was 54 micro-microfarads per foot.

It will be recognized that the invention as described above has indicated a solution for restoring the frequency response lost in the use of long cables and will give a more accurate representation of the vibration indicated by the strain gage.

Obviously many modifications and variations of the present invention are possible in the light of the above teachings. It is therefore to be understood that within the scope of the appended claims the invention may be practiced otherwise than as specifically described.

What is claimed is:

1. A direct current bridge network for measuring the frequency of vibration of a vibrating member, said bridge having a first, second, third and fourth terminal, a direct current voltage impressed across the first and second terminals, output voltage being taken across the third and fourth terminals, two strain gages mounted on the member and connected in series, a three conductor cable, one conductor being connected between a common mid-point of the strain gages and the third terminal, and the other two conductors connecting the other ends of the strain gages to the first and second terminals respectively, two known resistors in series connected to the first and second terminals with a common mid-point of the resistors connected to the fourth terminal, the fourth terminal being grounded, and added capacitors of large capacitance as compared with the lumped capacitors of the cable, said added capacitors respectively, placed in parallel with the known resistors so that the frequency response of the output voltage taken across the third and fourth terminals determined by the change in resistance of the strain gages due to the vibration of the member upon which the strain gages are mounted is improved since the added capacitors hold the direct current voltage constant during a cycle of strain-gage resistance change.

2. A direct current bridge network for measuring the frequency of vibration of a vibrating member, said bridge having first, second, third, and fourth terminals, two resistors of predetermined resistance connected in series between the first and second terminals, said fourth terminal being the common mid-point between said two resistors, said fourth terminal being connected to ground potential, two compensating capacitors, each of said two resistors respectively shunted by one of said compensating capacitors, a direct current voltage impressed across the first and second terminals, an output voltage being taken across the third and fourth terminals, two resistance type strain gages mounted on said vibrating member and connected in series, a three conductor cable connected between said strain gages and said first, second, and third terminals, one conductor connected between the common mid-point of the strain gages and said third terminal, the other two conductors of said cable connecting respectively the other ends of said strain gages to said first and second terminals, lumped capacitors of the cable shunted across said strain gages, and said compensating capacitors having a large capacitance as compared with the lumped capacitance of said cable whereby the frequency response of the vibration of the member obtained from the output voltage is an accurate representation thereof since the compensating capacitors hold the direct current voltage constant during a cycle of strain-gage resistance change.

References Cited in the file of this patent

UNITED STATES PATENTS 2,700,089     John                   Jan. 18, 1955

OTHER REFERENCES

Article entitled "A Brief Summary of Bridge Networks" by Walter S. Seeley, Electrical Engineering, March 1940, pp. 108–111.